United States Patent [19]

Lee et al.

[11] Patent Number: 4,463,738
[45] Date of Patent: Aug. 7, 1984

[54] FUEL SYSTEM HEATING APPARATUS FOR DIESEL ENGINES

[76] Inventors: John R. Lee, 672 Fairway La., Frankfort, Ill. 60423; Stephen W. Buckner, 318 Willow Rd., Homewood, Ill. 60430

[21] Appl. No.: 428,252

[22] Filed: Sep. 29, 1982

[51] Int. Cl.³ .............................................. F02M 31/00
[52] U.S. Cl. .................... 123/552; 123/549; 123/142.5 E; 123/557; 219/205
[58] Field of Search ............... 123/549, 557, 142.5 E, 123/142.5 R, 552; 219/205, 206, 207

[56] References Cited

U.S. PATENT DOCUMENTS

| | | | | |
|---|---|---|---|---|
| 1,005,395 | 10/1911 | Wohl | ....................... | 123/557 |
| 1,754,080 | 4/1930 | Briggs | ....................... | 123/142.5 E |
| 1,881,722 | 10/1932 | Lee | ....................... | 123/142.5 E |
| 2,067,102 | 1/1937 | Simon | ....................... | 219/205 |
| 2,122,585 | 7/1938 | Pollack | ....................... | 123/142.5 E |
| 2,400,838 | 5/1946 | Olson | ....................... | 123/142.5 E |
| 2,677,040 | 4/1954 | Buron | ....................... | 123/142.5 E |
| 3,194,944 | 7/1965 | Papp | ....................... | 123/142.5 E |
| 3,835,290 | 9/1974 | Peters | ....................... | 123/142.5 E |
| 4,411,240 | 10/1983 | Kravetz | ....................... | 123/557 |

OTHER PUBLICATIONS

Whitney Catalog #410D, "Automotive Parts & Accessories", Spring 1981, pp. 36 & 145.

*Primary Examiner*—Ronald H. Lazarus
*Attorney, Agent, or Firm*—Buell, Blenko, Ziesenheim & Beck

[57] ABSTRACT

The apparatus includes an inverter connected with the vehicle battery and/or generator and/or alternator for supplying power at external power source voltage and frequency, a resistance heater positioned adjacent the vehicle fuel tank and/or fuel lines, and a relay connecting the heater to an external power source or to the inverter. The relay is biased to connect the heater with the inverter, and has an actuating coil which connects the heater with the external power source. The actuating coil is connected across the relay terminals which may be connected to the external power source.

3 Claims, 1 Drawing Figure

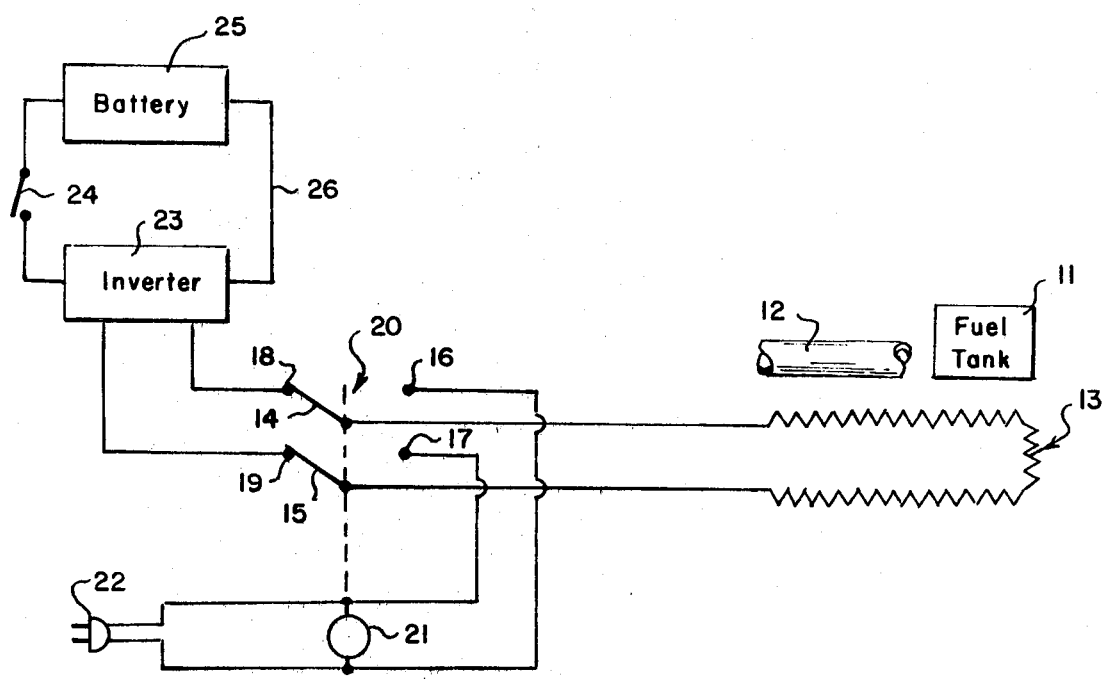

FUEL SYSTEM HEATING APPARATUS FOR DIESEL ENGINES

This invention relates to fuel systems for diesel automotive engines. It is more particularly concerned with apparatus for maintaining the fuel at temperatures above its pour point when the ambient temperature is below that pour point.

BACKGROUND OF THE INVENTION

Number 2 fuel oil, the conventional fuel for automotive diesel engines, has a pour point at about 20° F. Below that temperature the oil congeals, and if the oil temperature falls substantially below the pour point the oil will not flow satisfactorily from the fuel tank through the vehicle fuel lines. Thus, at oil temperatures about zero degrees or below, diesel automotive vehicles become difficult or impossible to start. Number 2 fuel oil can be winterized by blending with Number 1 fuel oil (pour point minus 16° F.) Once the engine is started it generates enough heat at ambient temperatures some way below the fuel pour point to keep its fuel flowing, but when ambient temperature reaches 15° or 20° below zero F. normal fuel flow cannot be maintained.

SUMMARY OF THE INVENTION

The apparatus of our invention to be described hereinafter heats the fuel tank and fuel lines by electrical resistance heaters. The heaters are energized either from an external source, such as a power line at conventional voltage, normally 117 volts 60 cycles, or from an inverter powered by the vehicle storage battery and/or generator and/or alternator. For convenience we prefer an inverter which converts the battery direct voltage to alternating voltage of the same magnitude and frequency as is supplied by the power line. Our apparatus also includes a relay which normally connects the resistance heater with the inverter, but which disconnects the heater from the inverter and connects the heater with the power line when our apparatus is plugged into the power line. When our apparatus is unplugged from the power line our relay reconnects the heater with the inverter.

DESCRIPTION OF PREFERRED EMBODIMENT

Fuel tank 11 and fuel line 12 from that tank to the diesel engine are fitted with a resistance heater 13 which may be in the form of conventional 117 volt heater type applied to tank 11 and fuel line 12. The terminals of heater 13 are connected with blades 14 and 15 of double pole-double throw relay 20. In one position of relay 20 those blades make contact with terminals 16 and 17 respectively, which are connected with the prongs of conventional plug 22 which fits a conventional power line outlet. In the other position relay 20 blades 14 and 15 make contact with terminals 18 and 19 respectively, which are connected with the output of inverter 23. The input of that inverter is connected across the vehicle storage battery 25, through a switch 24 and a common connection to the vehicle frame 26. Relay 20 is energized by a coil 21 connected across its terminals 16 and 17 so as to connect blades 14 and 15 with terminals 16 and 17 respectively. Blades 14 and 15 are of spring construction, or are actuated by gravity, so as to connect with contacts 18 and 19 respectively when coil 21 is deenergized.

When coil 21 is not energized, blades 14 and 15 of our relay 20 make contact with terminals 18 and 19 respectively, so connecting resistance heater 13 with inverter 23. That inverter supplies an output of the same voltage and frequency as the power line. Closing switch 24 thus energizes inverter 23, which in turn energizes heater 13. When a vehicle equipped with our apparatus as here described is standing in a garage or other location where our apparatus can be plugged into a power line, plug 22 is inserted into a power line outlet. Coil 21 is thus energized, and moves switch blades 14 and 15 into contact with terminals 16 and 17 respectively, so connecting resistance heater 13 across the power line and disconnecting that heater from inverter 23.

Our apparatus thus provides means for heating the vehicle fuel tank and fuel line from the car battery or from a power line, and automatically switches from one power source to the other when its power line plug is inserted into a power line receptacle or removed therefrom.

We claim:

1. In a motor vehicle having a battery, an internal combustion engine, a fuel tank and fuel lines therebetween, the improvement comprising an electrical resistance heater positioned adjacent the fuel tank and/or fuel lines, inverter means carried by the vehicle connected to its battery for converting battery voltage to external power source voltage and frequency, relay means carried by the vehicle for connecting the resistance heater either to an external power source or to the inverter, and actuating means for the relay means connecting the resistance heater with the inverter only after the relay means are disconnected from the external power source.

2. Apparatus of claim 1 in which the actuating means comprise an energizing coil connected across the external power source only when the relay means are connected with the external power source.

3. Apparatus of claim 2 in which the actuating means include means biasing the relay so as to connect the resistance heater with the inverter when the energizing coil is disconnected from the external power source.

* * * * *

UNITED STATES PATENT AND TRADEMARK OFFICE
CERTIFICATE OF CORRECTION

PATENT NO. : 4,463,738

DATED : August 7, 1984

INVENTOR(S) : JOHN R. LEE, et al.

It is certified that error appears in the above-identified patent and that said Letters Patent is hereby corrected as shown below:

Column 1, line 49, "type" should be --tape--.

Signed and Sealed this

Twenty-fifth Day of December 1984

[SEAL]

Attest:

*Attesting Officer*

GERALD J. MOSSINGHOFF

*Commissioner of Patents and Trademarks*